US008939571B2

(12) United States Patent
Sato et al.

(10) Patent No.: US 8,939,571 B2
(45) Date of Patent: Jan. 27, 2015

(54) INK JET RECORDING APPARATUS AND INK JET RECORDING METHOD

(71) Applicant: Seiko Epson Corporation, Tokyo (JP)

(72) Inventors: Masanao Sato, Fukuroi (JP); Satoshi Kimura, Shiojiri (JP); Tomoyuki Okuyama, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/273,825

(22) Filed: May 9, 2014

(65) Prior Publication Data

US 2014/0340438 A1 Nov. 20, 2014

(30) Foreign Application Priority Data

May 14, 2013 (JP) ................................ 2013-101928

(51) Int. Cl.
*G01D 11/00* (2006.01)
*B41J 2/165* (2006.01)
*B41J 2/07* (2006.01)

(52) U.S. Cl.
CPC ... *B41J 2/165* (2013.01); *B41J 2/07* (2013.01)
USPC .......................................................... 347/100

(58) Field of Classification Search
CPC ...... C09D 11/322; C09D 11/40; C09D 11/38; C09D 11/30; B41J 2/01; B41J 2/2107
USPC ......... 347/6, 9, 54, 68, 100; 106/31.13, 31.86
See application file for complete search history.

(56) References Cited

U.S. PATENT DOCUMENTS

| | | | |
|---|---|---|---|
| 7,163,577 B2 | 1/2007 | Tyrell | |
| 8,770,735 B2 * | 7/2014 | Hakiri et al. | 347/100 |
| 8,801,167 B2 * | 8/2014 | Katoh et al. | 347/100 |
| 2009/0130313 A1 | 5/2009 | Ohshima et al. | |
| 2012/0236068 A1 | 9/2012 | Matsushita | |

FOREIGN PATENT DOCUMENTS

| | | |
|---|---|---|
| JP | 2005-248178 A | 9/2005 |
| JP | 2008-137369 A | 6/2008 |
| JP | 2010-173256 A | 8/2010 |
| JP | 2012-193268 A | 10/2012 |

* cited by examiner

*Primary Examiner* — An Do

(74) *Attorney, Agent, or Firm* — Harness, Dickey & Pierce, P.L.C.

(57) ABSTRACT

An ink jet recording apparatus performs recording by discharging an ink composition onto a recording medium. The apparatus includes an ink jet head including a pressure-generating chamber containing an ink composition and applying a discharge pressure to the ink composition, a discharge port from which the ink composition is discharged, and a communicating path for communicating between the pressure-generating chamber and the discharge port. The ink composition is discharged from the discharge port at a discharge rate of 5 m/sec or more and 15 m/sec or less. The communicating path has a length of 40 μm or more and 600 μm or less. The ink composition contains a self-dispersible pigment and an organic solvent having a Hansen solubility parameter of 14 $(cal/cm^3)^{1/2}$ or more and 16 $(cal/cm^3)^{1/2}$ or less.

20 Claims, 3 Drawing Sheets

INK JET RECORDING APPARATUS AND INK JET RECORDING METHOD

Priority is claimed under 35 U.S.C. §119 to Japanese Application No. 2013-101928 filed on May 14, 2013, which is hereby incorporated by reference in its entirety.

BACKGROUND

1. Technical Field

The present invention relates to an ink jet recording apparatus and an ink jet recording method.

2. Related Art

As recording apparatuses that can record (print) on a variety of recording media, ink jet recording apparatuses have been known. JP-A-2010-173256 describes, as such an apparatus, a large format printer (LFP) for printing on relatively large recording media. This recording apparatus includes a platen for supporting a recording medium in the recording region, a transporting unit for transporting a recording medium onto the platen, and an ink jet head for discharging an ink on the recording medium and is configured so as to form images, characters, etc. by discharging ink droplets while scanning the ink jet head in a direction crossing the transporting direction of the recording medium.

In general, such an ink jet recording apparatus includes a maintenance unit for maintaining or recovering a satisfactory ink-discharging state. The maintenance unit includes, for example, a capping member for capping the nozzle face of the ink jet head and a wiping member for wiping the nozzle face.

The capping member air-tightly covers the nozzle face during the period when the ink jet recording apparatus is not used (non-operation state) to prevent the ink exposed at the nozzle or adhering to the nozzle periphery from evaporating, and thereby the ink is prevented from thickening and solidifying. The wiping member wipes away the ink adhering to the nozzle face, and thereby clogging of the nozzle by thickening or solidification of the remaining ink can be prevented.

Even in the operation state of the ink jet recording apparatus, the nozzle corresponding to the ink not used (non-discharging nozzle to which any ink-discharging signal for forming an image is not applied) is remained in a non-discharging state, depending on the content of recording. Consequently, clogging of the nozzle by thickening of the ink is apt to occur. In order to recover the nozzle in such a state, flashing (non-recording discharge) is performed. This is performed by intermittently and forcibly discharging an ink onto a recording medium in a region (region outside the scanning range of the ink jet head) other than the discharging region (for recording) to discontinue the non-discharging state and to remove the thickened ink.

However, in an ink jet recording apparatus of larger size and capable of recording more finely, the maintenance unit such as the capping member and the wiping member and the flashing discharge may not prevent nozzle clogging owing to thickening or solidification of an ink during the recording operation.

Specifically, in ink jet recording in recent years, in order to perform recording with higher fineness, the volume of each ink droplet to be discharged must be significantly small, such as several picoliters; the diameter of a nozzle for discharging an ink is reduced; and the energy for discharging ink droplets is also decreased. Because of the small nozzle diameter and the low discharging energy, even if the ink is slightly thickened at the ink jet head, the ink may not be discharged and may cause clogging of the nozzle. In particular, in LFPs compliant to large media, the minimum period of time (interval) to perform the flashing is increased with an increase in the length of the ink jet head to be scanned (scanning distance and scanning time). Accordingly, this tendency (tendency of thickening of ink during the recording operation) is significant in the non-discharging nozzle that does not discharge the ink. As a result, clogging of the nozzle disadvantageously occurs during the recording operation.

As a solution for the above-mentioned problems, for example, the thickened ink is discharged by extremely increasing the potential difference between the driving voltages applied to the piezoelectric elements of the head. However, such a method may increase the volume of the ink droplet or deteriorate the recording quality due to the generation of ink mist.

Thus, the method of preventing clogging by the above-described maintenance unit, flashing, or application of a driving voltage involves a problem that the ink jet recording for recording with higher fineness on a larger medium cannot achieve satisfactory recording.

SUMMARY

An advantage of some aspects of the invention is to solve at least a part of the disadvantages described above, and the invention can be realized as the following application examples or aspects.

Application Example 1

An ink jet recording apparatus according to this application example is an ink jet recording apparatus performing recording by discharging an ink composition onto a recording medium, wherein the apparatus includes an ink jet head including a pressure-generating chamber containing an ink composition and applying a discharge pressure to the ink composition, a discharge port from which the ink composition is discharged, and a communicating path for communicating between the pressure-generating chamber and the discharge port; the ink composition is discharged from the discharge port at a discharge rate of 5 m/sec or more and 15 m/sec or less; the communicating path has a length of 40 μm or more and 600 μm or less; and the ink composition contains a self-dispersible pigment and an organic solvent having a Hansen solubility parameter of 14 $(cal/cm^3)^{1/2}$ or more and 16 $(cal/cm^3)^{1/2}$ or less.

In the state in which the ink composition is not discharged from the ink jet head (non-discharging time), the ink composition stays at the discharge ports and is exposed to the air. If this state continues, the ink composition near the discharge ports is thickened or solidified (e.g., aggregation of the pigment) by evaporation of the organic solvent or separation of the pigment from the organic solvent. If the pigment is separated from the organic solvent, pigment particles having relatively small particle diameters are apt to aggregate at the end in the vertical direction (i.e., in the vicinity of the discharge ports). The degree of thickening or solidification of the ink composition is higher in the ink composition being closer to the exposing surface; and the quantity of thickening or solidification is larger in the ink composition having a broader exposing surface. If the thickening reaches inside the pressure-generating chamber, the pressure generated in the pressure-generating chamber significantly decreases to be insufficient for discharging the ink composition, resulting in ink clogging. Meanwhile, if the surface of the ink composition is thickened or solidified once, the rate of the thickening or solidification inside thereof tends to decrease.

In the application example, the ink jet recording apparatus includes communicating paths each communicating between a pressure-generating chamber and a discharge port. Accordingly, even if thickening or solidification of the ink composition occurs near the discharge port, the thickening or solidification is prevented from reaching the pressure-generating chamber being apart from the discharge port by the communicating path. As a result, the pressure-generating chamber does not highly affect or less affects the pressure to be generated.

In the application example, since the ink composition is discharged from the discharge ports at a relatively high discharge rate of 5 m/sec or more, ink clogging owing to thickening or solidification of the ink composition is prevented from occurring near the discharge ports. Specifically, even if a certain degree of thickening or solidification of the ink composition spreads from near the discharge port to the communicating path, since the pressure generated by the pressure-generating chamber due to high speed discharge is relatively high, the thickened or solidified ink composition is readily discharged from the discharge port. That is, the ink composition is readily recovered from ink clogging. In addition, since the ink composition-discharging rate is 15 m/sec or less, when the ink composition having a normal viscosity is discharged after the thickened or solidified ink composition is discharged from the discharge port, the droplets of the ink composition are not broken into smaller droplets. That is, the ink composition can be discharged in a desired state without being discharged in a mist state.

In the application example, the ink composition contains a pigment and an organic solvent having a Hansen solubility parameter (hereinafter referred to as SP value) of 14 $(cal/cm^3)^{1/2}$ or more and 16 $(cal/cm^3)^{1/2}$ or less. The use of the organic solvent having an SP value of 14 $(cal/cm^3)^{1/2}$ or more and 16 $(cal/cm^3)^{1/2}$ or less further inhibits separation of the pigment (e.g., a self-dispersible pigment having carboxyl groups on the surface) contained in the ink composition to maintain the dispersion state more stably, resulting in inhibition of thickening or solidification owing to aggregation of the pigment near the discharge ports.

As in the application example, since the communicating paths have a length of 40 μm or more, even if the ink composition is thickened or solidified near a discharge port, the thickening or solidification is prevented from reaching the pressure-generating chamber being apart from the discharge port by at least 40 μm via the communicating path.

As in the application example, since the communicating paths have a length of 600 μm or less, the ink jet head can be configured without increasing the size beyond necessity. The distance from the pressure-generating chamber to the discharge port is 600 μm or less, which can inhibit a reduction in discharge efficiency, due to, for example, increases in discharge resistance or discharge time lag, in acquisition of the above-described effects.

For example, even if the ink jet head is configured by stacking silicon substrates, the layered structure for forming the communicating paths can be formed by the silicon substrates having a thickness of 40 μm or more and 600 μm or less. Accordingly, the formation of the substrate material or the formation of the layered structure can be more simply and easily performed.

As described above, in the application example, thickening or solidification of the ink composition inside the pressure-generating chambers is inhibited, thickening or solidification of the ink composition owing to aggregation of the pigment near the discharge ports is inhibited, and since ink clogging can be readily removed even if a certain degree of thickening or solidification of the ink composition spreads from near the discharge port to the communicating path, the clogging of the discharge ports (nozzles) can be inhibited. As a result, for example, in an ink jet recording apparatus having a nozzle that does not discharge an ink composition for a relatively long time (for example, an LFP performing large-sized recording), clogging of the nozzle during recording operation is prevented to allow more satisfactory recording.

Application Example 2

In the ink jet recording apparatus according to application example 1, the apparatus has a discharge port resolution per unit length of the recording head of 200 dpi or more.

In this application example, the discharge port resolution per unit length of the recording head is 200 dpi or more. As an effect by inhibition of nozzle clogging, the volume of the ink composition to be discharged (ink droplet) can be further reduced. Finer recording can be achieved by reducing the volume of each ink droplet and setting the discharge port resolution per unit length of the recording head to 200 dpi or more.

Application Example 3

In the ink jet recording apparatus according to the application examples above, the pigment is preferably a self-dispersible pigment having a carboxyl group on the surface.

As in this application example, a self-dispersible pigment having carboxyl groups on the surface is well dispersed in an organic solvent having an SP value of 14 $(cal/cm^3)^{1/2}$ or more and 16 $(cal/cm^3)^{1/2}$ or less. Accordingly, the pigment is inhibited from aggregating and solidifying near the discharge ports. As a result, clogging of the nozzles during recording operation is prevented to allow more satisfactory recording.

Application Example 4

In the ink jet recording apparatus according to the application examples above, the apparatus includes a scanning mechanism for moving the ink jet head and a transporting mechanism for moving the recording medium; the scanning mechanism moves the ink jet head so as to perform scanning and thereby forms a recording discharge region onto which the ink composition is discharged and moves the ink jet head to a region outside the recording discharge region and thereby forms a non-recording discharge region onto which the ink composition is discharged; the transporting mechanism transports the recording medium to the recording discharge region and moves the recording medium in a direction crossing the extending direction of the recording discharge region; and an recorded image has a recording resolution of 200 dpi or more in the direction of movement of the recording medium by the transporting mechanism.

In this application example, the scanning mechanism moves the ink jet head to form a recording discharge region onto which the ink composition is discharged and a non-recording discharge region at a region outside the recording discharge region. The transport mechanism transports the recording medium to the recording discharge region and moves the recording medium in a direction crossing the extending direction of the recording discharge region. This constitution can inhibit clogging of the nozzles from occurring during scanning by performing flashing onto the non-recording discharge region formed in a region outside the recording discharge region during the intervals between scannings for recording (recording discharge onto a recording discharge region).

This constitution can configure a large-sized ink jet recording apparatus performing recording with high fineness, in addition to the effects in the application examples above. Specifically, the intervals of flashing onto the non-recording discharge region can be increased as an effect of inhibiting clogging of the nozzles from occurring during recording operation. Accordingly, for example, in a case of disposing the non-recording discharge region on each side of the recording discharge region, the length of scanning by the ink jet head can be elongated to increase the recording discharge region. That is, a larger-sized ink jet recording apparatus can be configured. In addition, as an effect by inhibition of nozzle clogging, the volume of the ink composition to be discharged (ink droplet) can be further reduced. Finer recording can be achieved by reducing the volume of each ink droplet and setting the recording resolution to 200 dpi or more.

Application Example 5

In the ink jet recording apparatus according to the application examples above, the recording discharge region has a length of 60 cm or more.

In this application example, according to the effects of the application examples described above, the recording discharge region can have a length of 60 cm or more. As a result, a large-sized ink jet recording apparatus performing recording with high fineness can be configured.

Application Example 6

In the ink jet recording apparatus according to the application examples above, the ink jet head preferably includes a piezoelectric element that fluctuates the capacity of the pressure-generating chamber, and the piezoelectric element is preferably driven with a driving potential difference of 10 V or more and 30 V or less.

In this application example, the ink jet head includes piezoelectric elements for fluctuating the capacities of the pressure-generating chambers, and the piezoelectric elements are driven with a potential difference of 10 V or more and 30 V or less.

Since the piezoelectric element is driven at a relatively high voltage of 10 V or more, ink clogging owing to thickening or solidification of the ink composition is prevented from occurring near the discharge port. Specifically, even if a certain degree of thickening or solidification of the ink composition spreads from near the discharge port to the communicating path, since the pressure generated by the pressure-generating chamber is relatively high due to the piezoelectric element that is driven with a relatively high voltage, the thickened or solidified ink composition is readily discharged from the discharge port. That is, the ink composition is readily recovered from ink clogging. In addition, since each piezoelectric element is driven with a potential difference of 30 V or less, the pressure generated by the pressure-generating chamber is not increased beyond necessity. As a result, when the ink composition having a normal viscosity is discharged after the thickened or solidified ink composition is discharged from the discharge port, the droplets of the ink composition are not broken into smaller droplets. That is, the ink composition can be discharged in a desired state without being discharged in a mist state.

Application Example 7

In the ink jet recording apparatus according to the application examples above, the ink composition contains the pigment in a content of 2% by mass or more and 8% by mass or less.

As in this application example, an ink composition that can more effectively inhibit the clogging of the discharge ports (nozzles) owing to thickening or solidification of the ink composition during the non-discharging time can be obtained by controlling the amount of the pigment contained in the ink composition to 2% by mass or more and 8% by mass or less.

Application Example 8

In the ink jet recording apparatus according to the application examples above, the ink jet head discharges the ink composition from the discharge ports onto the non-recording discharge region and discharges the ink composition from the same discharge ports onto the non-recording discharge region again within a time interval of 1.5 seconds or more and 6.0 seconds or less.

In this application example, according to the effects of the application examples described above, the ink jet recording apparatus can have the discharge ports that discharge of the ink composition repeatedly at a maximum time interval of 1.5 seconds or more and 6.0 seconds or less. Accordingly, for example, the interval of the flashing described above can be elongated up to 6 seconds. That is, for example, even if any of the nozzles is not applied with ink discharging signals for forming an image, the scanning time can be elongated up to the range that allows the interval of flashing to be 6 seconds. That is, if the scanning speed is not changed, the length of the recording discharge region can be elongated up to the range that allows the interval of flashing to be 6 seconds. As a result, a large-sized ink jet recording apparatus performing recording with high fineness can be configured.

Application Example 9

In the ink jet recording apparatus according to the application examples above, the piezoelectric element during the time in which the ink is not discharged is driven with a voltage having a potential difference that does not allow the ink composition to be discharged.

In this application example, the piezoelectric element during the time in which the ink is not discharged is vibrated with a driving voltage that does not allow the ink composition to be discharged. As a result, during the non-discharging time, the thickened or solidified ink composition is prevented from adhering to the peripheries of the discharge ports. Accordingly, the clogging of the nozzles can be further inhibited, together with the effect of the application examples described above.

Application Example 10

In the ink jet recording apparatus according to the application examples above, the organic solvent is preferably a lactam or a polyhydric alcohol.

As in this application example, an ink composition that can more effectively inhibit the clogging of the discharge ports (nozzles) owing to thickening or solidification of the ink composition during the non-discharging time can be obtained by using a lactam or polyhydric alcohol as the organic solvent.

Application Example 11

The ink jet recording method according to this application example performs recording using the ink jet recording apparatus according to any of the application examples.

In the application example, a larger-sized ink jet recording with high fineness can be achieved by performing the recording using the ink jet recording apparatus that can provide the effects in the application examples described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the drawings. The embodiments described below are merely examples, and the invention is not limited thereto. Note that the scale of each drawing may be different from the actual scale for the sake of convenience of description.

Embodiment 1

An ink jet recording apparatus according to Embodiment 1 will be described.

Figure 1A:
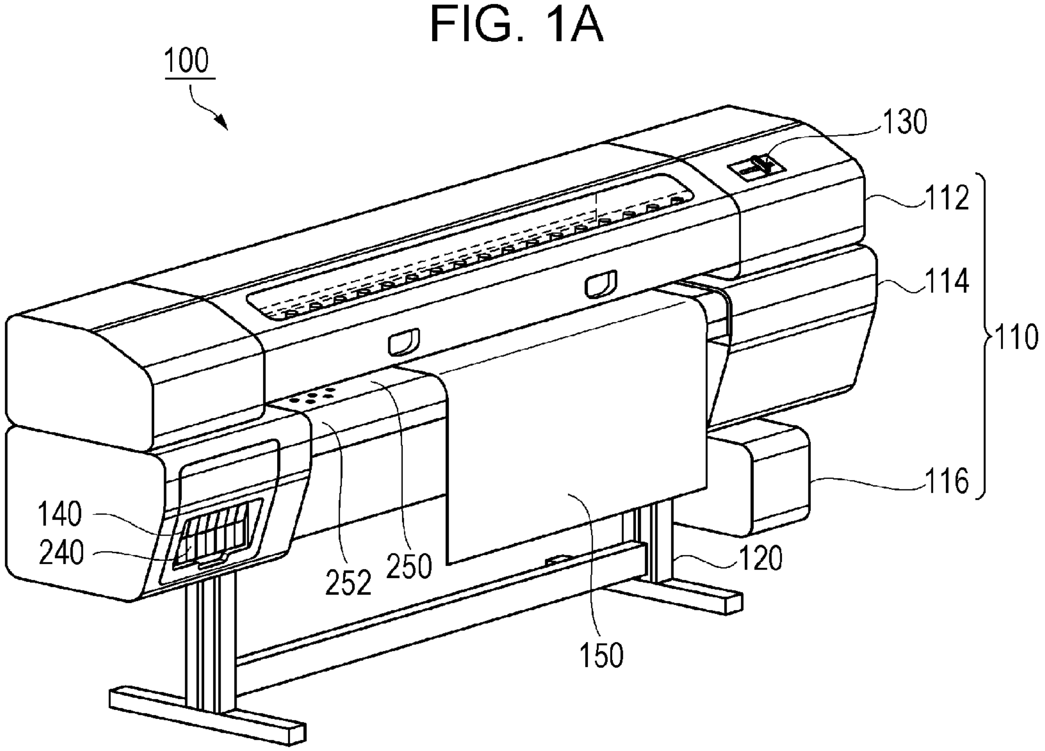
FIGS. 1A and 1B are oblique views illustrating an appearance of the ink jet recording apparatus according to Embodiment 1.
Figure 1B:
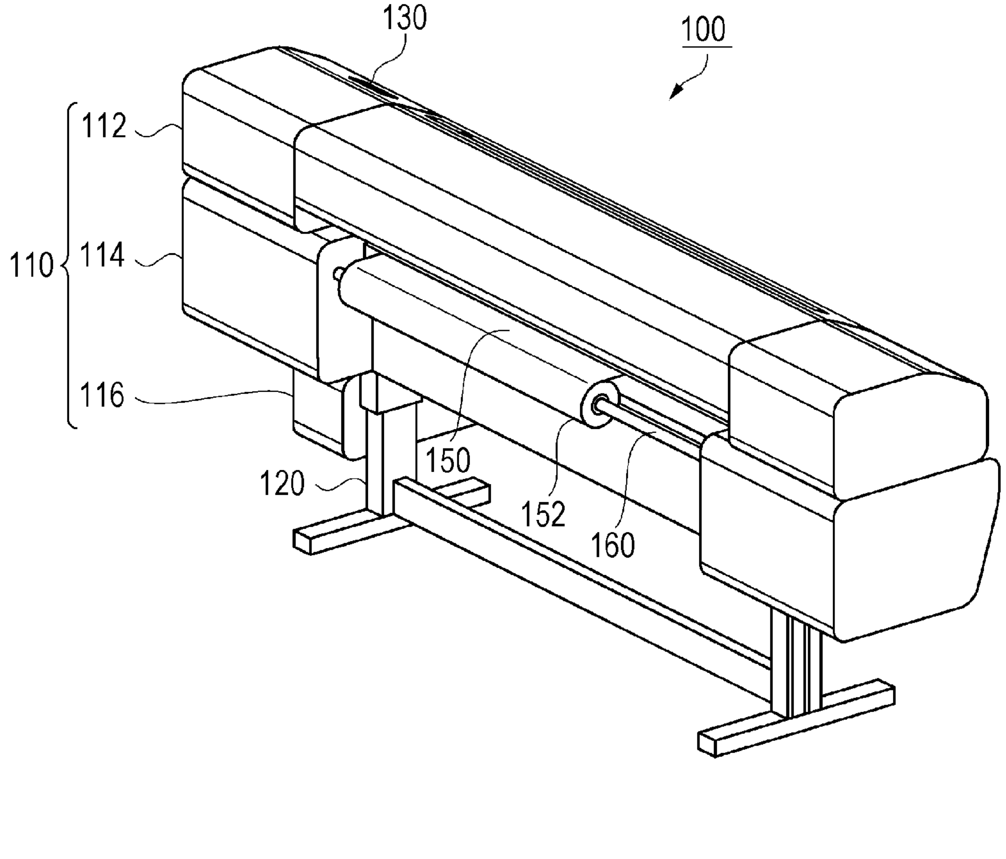

FIGS. 1A and 1B are oblique views illustrating appearances of an ink jet recording apparatus 100 according to an embodiment. The ink jet recording apparatus 100 performs recording by discharging an ink composition (hereinafter, also merely referred to as ink) onto a recording medium, e.g., large-sized, such as JIS A1 size, cut-form paper or roll paper having the same width as that of the cut-form paper. Examples of the recording medium include resin films in addition to paper.

1. Ink Jet Recording Apparatus 1-1. Housing

As shown in FIG. 1A, the ink jet recording apparatus 100 has a housing 110 including an upper housing 112, a lower housing 114, and a small housing 116. The upper housing 112 and the lower housing 114 are stacked to each other, and the small housing 116 is pendent from the lower housing 114. The housing 110 is supported by a leg portion 120 from the below. Such a configuration forms a space for ejecting a recording medium (recording sheet 150) below the housing 11 after recording.

The upper housing 112 is provided with an operation panel 130 that is used when the ink jet recording apparatus 100 is operated in stand-alone mode.

The lower housing 114 is provided with a cartridge holder 140 loaded with an ink cartridge 240 containing inks.

In the ink jet recording apparatus 100, a recording sheet 150 on which an image (including data such as characters) has been recorded is fed from between the upper housing 112 and the lower housing 114 to the front (in the front of FIG. 1A). The fed recording sheet 150 hangs down gravitationally. Accordingly, a smooth guide face 252 for smoothly guiding the recording sheet 150 is formed at the front end of a suction platen 250 provided to the gap between the upper housing 112 and the lower housing 114.

Herein, the direction in which the upper housing 112 is stacked on the lower housing 114 is described as the upward direction. In FIG. 1A, the direction in which the recording sheet 150 is fed is described as the forward direction.

FIG. 1B is an oblique view illustrating the appearance of the back of the ink jet recording apparatus 100. As shown in this drawing, in the back of the ink jet recording apparatus 100, the lower housing 114 supports a spindle 160 horizontally bridged at the rear and a roll 152 through which the spindle passes. The roll 152 is formed by winding a long recording sheet 150. FIG. 1A shows the recording sheet 150 drawn from the roll 152, passing through the inside of the housing 110, and then drawn to the front.

1-2. Internal Mechanism

Figure 2A:
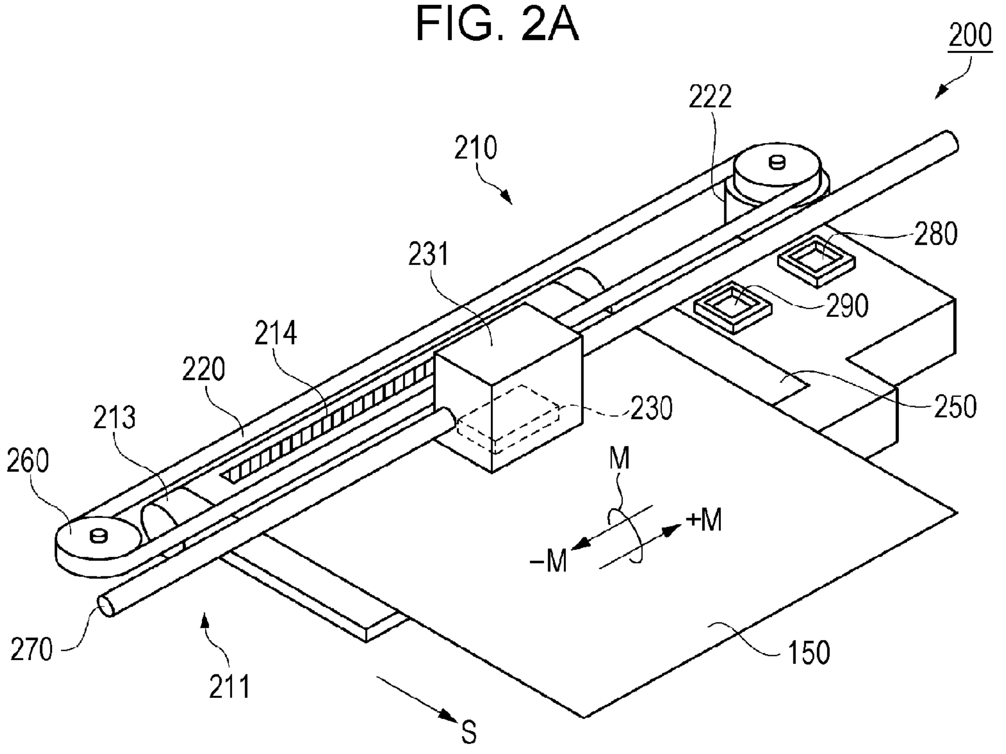
FIG. 2A is an oblique view schematically illustrating the internal mechanism of the ink jet recording apparatus according to Embodiment 1.
Figure 2B:
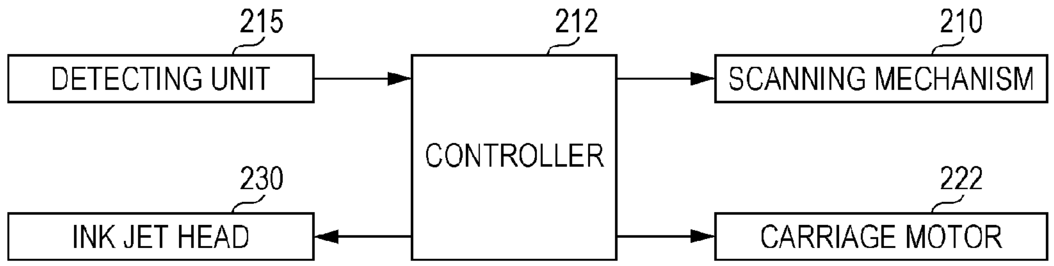
FIG. 2B is a brief block diagram of the control system of the ink jet recording apparatus.

FIG. 2A is an oblique view schematically illustrating the internal mechanism 200 of the ink jet recording apparatus 100. FIG. 2B is a brief block diagram of the control system of the ink jet recording apparatus 100.

The internal mechanism 200 includes an ink jet head 230, a scanning mechanism 210 for moving the ink jet head 230, a transporting mechanism 211 for moving a recording medium, and controller 212 for controlling these mechanisms.

The ink jet head 230 is provided with a large number of nozzles, for discharging an ink supplied from the ink cartridge 240 (FIG. 1A), on the side at which the recording medium is mounted (the side facing the recording sheet 150). The discharge of inks from the ink jet head 230 is controlled by the controller 212 (see FIG. 2B).

The details of the ink jet head 230 will be described later.

The scanning mechanism 210 is composed of at least a guide rail 270, a carriage 231, and a carriage motor 222.

The guide rail 270 is, as shown in FIG. 2A, disposed so as to horizontally extend in the longitudinal direction in the upper housing 112.

The carriage 231 is disposed so as to horizontally reciprocate (scan) along the guide rail 270 in the reciprocating direction M and carries the ink jet head 230 while being supported by the guide rail 270.

At the rear of the guide rail 270, a pair of pulleys 260 is disposed, and a timing belt 220 is mounted on the pulleys 260. One of the pulleys 260 is rotationally driven by the carriage motor 222. The timing belt 220 is driven in parallel to the guide rail 270 between the pulleys 260. A part of the timing belt 220 is connected to the carriage 231. In such a configuration, the carriage 231 can move according to the driving signals supplied to the carriage motor 222 from the controller 212.

Furthermore, a linear scale 214 is disposed in parallel to the reciprocating direction M. The linear scale 214 includes a transparent body and light-shielding bands formed along the reciprocating direction M at a prescribed period. The carriage 231 includes a detecting unit 215 (FIG. 2B) for detecting the light-shielding bands. The detection results by the detecting unit 215 are output to the controller 212 (FIG. 2B). As a result, the quantity of the movement of the carriage 231 can be exactly detected.

Thus, the scanning mechanism 210 precisely moves the ink jet head 230 for scanning to form a region in which an ink is discharged (recording discharge region) on the recording medium.

The length of the recording discharge region is 60 cm and therefore can correspond to recording up to JIS A1 size.

The length of the recording discharge region is not limited thereto. For example, if the recording discharge region has a length of 110 cm, recording up to JIS BO size is possible. It is preferable to appropriately set the scanning speed of the ink jet head 230 by the scanning mechanism 210, the amount of droplets of the ink to be discharged, and the discharge rate considering the recording density and the state of occurrence of nozzle clogging.

The transporting mechanism 211 includes at least a transport driving motor (not shown), a transport driving roller 213, a transport following roller (not shown), and a suction platen 250.

The transport driving roller 213 and the suction platen 250 are disposed below the guide rail 270 in this order along the transporting direction S of the recording sheet 150 shown in the drawing. The transport driving roller 213 is received inside the upper housing 112. On the other hand, the suction platen 250 is received in the lower housing 114.

The transport driving roller 213 is rotationally driven by the transport driving motor and rotates while being pressed by the transport following roller having the recording sheet 150 therebetween to extract the recording sheet 150 from the roll 152 at the rear and send it onto the suction platen 250 in the front.

The suction platen 250 has a horizontal flat surface and supports the recording sheet 150 sent by the transport driving roller 213 from the below. The suction platen 250 has a surface provided with a large number of suction holes communicating with a reduced pressure source such as a suction fan and suctions the recording sheet 150. As a result, the suction platen 250 removes the curl of the recording sheet 150 and retains it flat below the ink jet head 230.

Furthermore, a flashing portion 290 and a cap 280 serving as a maintenance unit are disposed in this order in the non-recording discharge region at the outside of the suction platen 250 (the outside of the above-described recording discharge region) in the reciprocating direction M of the carriage 231. The transporting mechanism 211 can move the carriage 231 (ink jet head 230) to this region from the recording discharge region.

The controller 212 moves the carriage 231 (ink jet head 230) to the flashing portion 290 by the transporting mechanism 211 and performs flashing by discharging an ink from a predetermined nozzle. The flashing portion 290 absorbs the ink discharged by the flashing. This flashing process can remove the thickened ink from the ink jet head 230.

The cap 280 air-tightly seals the lower face of the ink jet head 230 during the pause period of the ink jet recording apparatus 100 to prevent thickening or solidification of the ink in the ink jet head 230.

The predetermined nozzle discharging an ink in the flashing is the non-discharging nozzle to which any ink-discharging signal for performing recording (formation of an image or a character) is not applied for a longer time than a predetermined time even during the recording operation. The predetermined time for any ink-discharging signal is not applied is a maximum period of time during which ink clogging by thickening or solidification of the ink hardly occurs and is set to be 6.0 seconds at the longest in this embodiment.

The flashing may be performed for all the nozzles without limiting to a predetermined nozzle. Since the flashing is a process of forcibly discharging an ink for inhibiting ink clogging, the discharge amount (discharge amount in the non-recording discharge region) is preferably larger than that in recording. However, implementation of the flashing to all nozzles equally or frequently significantly enhances the consumption of the ink. Accordingly, as in the embodiment, the flashing is preferably performed for a predetermined nozzle only or at an interval of at least 1.5 seconds.

In the example shown in FIG. 2A, the flashing portion 290 is disposed at only one side of the scanning region (recording discharge region) of the ink jet head 230, but is not limited thereto, and may be disposed at each side of the scanning region. The length of the scanning region can be elongated by disposing the flashing portion 290 at each side of the scanning region if the flashing intervals are the same.

The controller 212 includes a driving IC and controls the transportation of the recording sheet 150 through the transporting mechanism 211 as shown in FIG. 2B. In addition, the controller 212 controls the driving of the carriage motor 222 on the basis of the detection results of the detecting unit 215 to control the position, speed, etc. of the carriage 231 and also controls the discharge of the ink by the ink jet head 230 at a predetermined position relative to the recording sheet 150.

2. Ink Jet Head

Figure 3A:
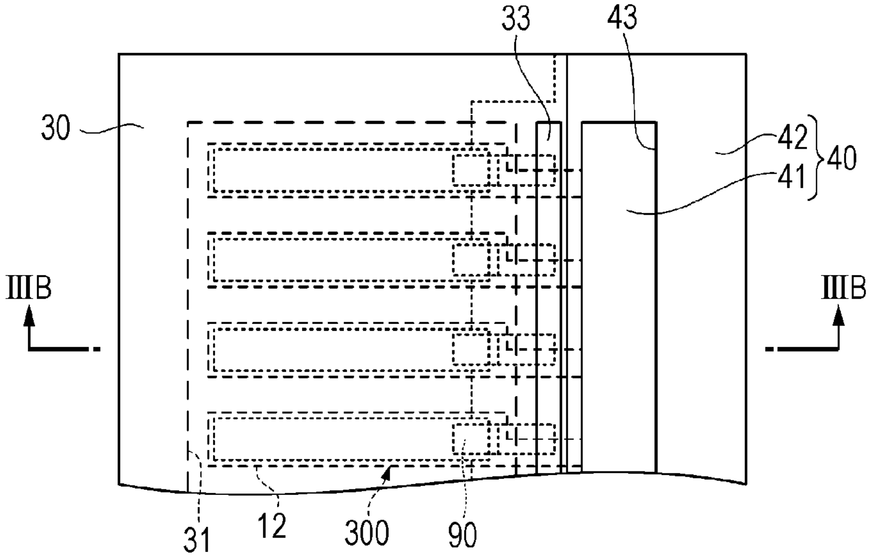
FIG. 3A is a partial plan view of an ink jet head.
Figure 3B:
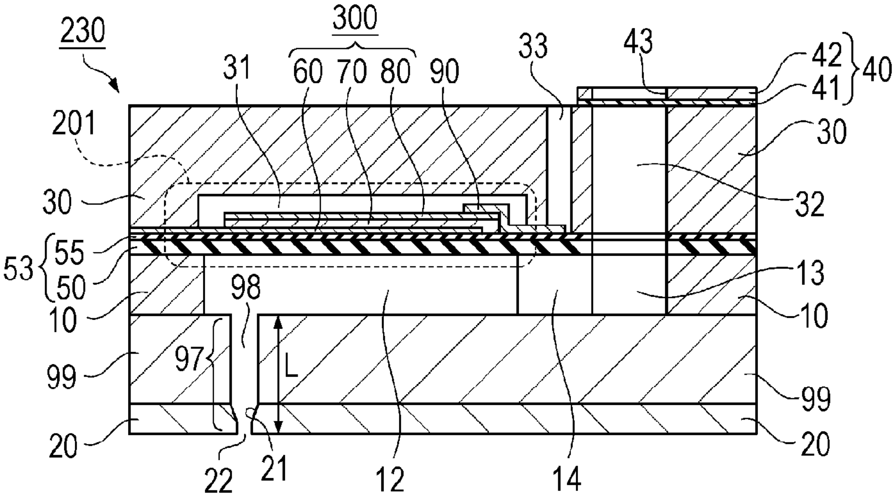
FIG. 3B is a partial cross-sectional view of the ink jet head.

FIG. 3A is a partial plan view of an ink jet head 230, and FIG. 3B is a partial cross-sectional view taken along the line IIIB-IIIB of FIG. 3A.

The ink jet head 230 includes piezoelectric actuators 201, a passage-forming substrate 10, a communicating path-forming plate 99, a nozzle plate 20, and a protective substrate 30. The piezoelectric actuators 201 are each composed of at least a piezoelectric element 300 and a diaphragm 53.

2-1. Passage-Forming Substrate

The passage-forming substrate 10 forms passages in which an ink flows. The passage-forming substrate 10 consists of a single-crystal silicon substrate having a plane direction (110).

The passage-forming substrate 10 has spaces that are used as pressure-generating chambers 12, a communication chamber 13, and ink supply passages 14 when the ink jet head 230 has been assembled. The spaces that are used as the pressure-generating chambers 12, the communication chamber 13, and ink supply passages 14 are prepared by, for example, perforating the passage-forming substrate 10 by a known etching method.

As shown in FIG. 3A, a plurality of the pressure-generating chambers 12 is arranged. The pressure-generating chambers 12 are each drawn so as to have a rectangular parallelepiped shape. The shape is not limited thereto and may be, for example, a parallelepiped or trapezoidal column. The pressure-generating chamber 12 varies the capacity by flexural deformation of the piezoelectric actuator 201.

One end of each of the ink supply passage 14 communicates with the pressure-generating chamber 12, and the other end of the ink supply passage 14 communicates with the communication chamber 13. One pressure-generating chamber 12 corresponds to one ink supply passage 14. The communication chamber 13 communicates with the pressure-generating chambers 12 through the ink supply passages 14 provided to the respective pressure-generating chambers 12. That is, the ink flowing into the communication chamber 13 flows into the pressure-generating chambers 12 via the ink supply passages 14.

2-2. Communicating Path-Forming Plate

The communicating path-forming plate 99 adheres to one surface (lower surface) of the passage-forming substrate 10 with, for example, an adhesive or thermal welding film such that the other surface (upper surface) forms the bottom of the pressure-generating chamber 12. The communicating path-forming plate 99 is provided with communication holes passing through from the bottom of the pressure-generating chamber 12 to the corresponding nozzles 21 provided to the nozzle plate 20. An optimum example of the communicating path-forming plate 99 is a single-crystal silicon substrate, but the communicating path-forming plate 99 is not limited thereto, and, for example, glass ceramics or stainless steel also can be used.

2-3. Nozzle Plate

The nozzle plate 20 adheres to the other surface (lower surface) of the communicating path-forming plate 99 with, for example, an adhesive or thermal welding film.

The nozzle plate 20 is drilled to form nozzles 21. The nozzle plate 20 is, for example, a glass ceramics, single-crystal silicon, or stainless steel substrate. Among these substrates, the nozzle plate 20 is preferably a single-crystal silicon substrate from the viewpoint of providing a higher density of nozzles.

The nozzles 21 are provided so as to communicate with the corresponding pressure-generating chambers 12 through the communication holes 98. The number of the nozzles 21 is preferably 200 or more per inch (a nozzle resolution of 200 dpi or more, in this embodiment, in the longitudinal direction, i.e., in the direction crossing the scanning direction of the carriage 231), more preferably 360 or more per inch. A nozzle (discharge port) resolution (in the longitudinal direction) of 200 dpi or more allows formation of a large-sized image with high image quality. The problem that a high-density ink jet recording head tends to reduce the discharge stability can be solved by applying the invention.

The nozzles 21 may have any shape and may be, for example, in a cylinder shape extending in the ink-discharging direction (e.g., column, frustum, polygonal column, or elliptic cylinder) or in a shape of combination of cylinders having different volumes. The tip of the nozzle 21 in the ink discharging direction, i.e., each opening of the nozzle plate 20 is formed as a discharge port 22 from which an ink is discharged. The discharge port 22 may have any shape, such as a circular, elliptic, or polygonal shape. A circular or elliptic shape is preferred from the viewpoint of inhibiting, for example, clogging of ink.

2-4. Communicating Path

Each ink channel from the bottom of the pressure-generating chamber 12 to the discharge port 22, formed by the communicating path-forming plate 99 and the nozzle plate 20 as passage-forming substrates, forms a communicating path 97. Accordingly, the length of the communicating path 97 is the sum of the thickness of the communicating path-forming plate 99 and the thickness of the nozzle plate 20 when the communicating path 97 is formed so as to be perpendicular (the normal direction) to the faces of the communicating path-forming plate 99 and the nozzle plate 20. The communicating path 97 is preferably formed such that the inner wall surfaces of the communication hole 98 and the nozzle 21 are sequential.

The communicating path 97 preferably has a length L of 40 μm or more and 600 μm or less, more preferably 100 μm or more and 500 μm or less, and most preferably 200 μm or more and 400 μm or less. Such communicating paths 97 can inhibit clogging of an ink near the nozzles while maintaining the miniaturization of the head.

The ink jet head 230 preferably has passage-forming substrates for the communicating paths 97 as shown in FIG. 3B. In such a configuration, for example, the length and diameter of the communicating path 97 can be easily controlled, which also allows easy manufacturing thereof.

The ink supplied to the pressure-generating chamber 12 is discharged from the nozzle 21 (discharge port 22). On this occasion, the ink droplets are preferably discharged at a discharge rate of 5 m/sec or more, more preferably 6 m/sec or more, and most preferably 7 m/sec or more. The discharge rate is preferably 15 m/sec or less and more preferably less than 10 m/sec. The discharge of the ink at such a drop speed can prevent generation of mist of the ink, even if it takes a certain flying time, while preventing clogging.

The discharge rate of liquid droplets can be measured with, for example, an ink jet liquid droplet automatic measurement device (trade name: "JetMeasure", manufactured by Microjet corporation). A single liquid droplet discharged from a nozzle may be divided into a plurality of droplets at the time of parting from the nozzle or during flying. In such a case, the measurement is based on the amount of the largest droplet among the plurality of liquid droplets.

2-5. Piezoelectric Actuator

The piezoelectric actuators 201 are disposed on the other surface of the passage-forming substrate 10 (i.e., the upper surface on the opposite side to the surface adhering to the communicating path-forming plate 99). The piezoelectric actuators 201 each include a diaphragm 53 and a piezoelectric element 300 serving as a driving means.

The diaphragm 53 includes an elastic film 50 (for example, a silicon nitride film having a thickness of about 1.0 μm) and an insulating film 55 (for example, a zirconium oxide film having a thickness of about 0.35 μm) formed on the elastic film 50.

The piezoelectric elements 300 are formed in the regions facing the corresponding pressure-generating chambers 12 through the diaphragms 53. Specifically, it is only required that a piezoelectric active section (the portion at which piezoelectric strain is generated by application of a voltage to the upper electrode 80 and the lower electrode 60) is disposed for each pressure-generating chamber 12.

The piezoelectric element 300 including a lower electrode 60 (having a thickness of, for example, about 0.1 to 0.2 μm), a piezoelectric layer 70 (having a thickness of, for example, about 0.2 to 5 μm), and an upper electrode 80 (having a thickness of, for example, about 0.05 μm) is formed on the insulating film 55.

The lower electrode 60 may be made of platinum, iridium, or an alloy thereof. The upper electrode 80 may be made of a metal such as aluminum, gold, nickel, platinum, or iridium, an alloy of these metals, or a conductive oxide. The piezoelectric layer 70 may be made of any material and may be made of, for example, a peroviskite ferromagnetic material, such as a lead-based piezoelectric material represented by lead zirconate titanate or a lead-free piezoelectric material represented by barium titanate, potassium niobate, or bismuth ferrite. Herein, the piezoelectric layer 70 is made of lead zirconate titanate PZT as a preferred example. The piezoelectric layer 70 preferably discharges an ink composition by means of deformation in a flexural mode.

In general, one of electrodes of the piezoelectric element 300 is the common electrode, and the other electrode and the piezoelectric layer 70 are patterned for each pressure-generating chamber 12. In the embodiment, the lower electrode 60 is the common electrode for the piezoelectric elements 300, and the upper electrode 80 is the individual electrode of each of the piezoelectric elements 300. The configuration may be reversed depending on a driving circuit or wiring.

The piezoelectric actuator 201 includes lead electrode 90. The upper electrode 80 of each piezoelectric element 300 is connected to a lead electrode 90 made of, for example, gold (Au), and a voltage is selectively applied to each piezoelectric element 300 via the lead electrode 90.

2-6. Protective Substrate

The protective substrate 30 includes piezoelectric element holding portions 31 for protecting the piezoelectric elements 300 to form spaces at the regions facing the respective piezoelectric elements 300.

The space formed at each piezoelectric element holding portion 31 may be sealed or not be sealed as long as it is enough not to hinder the movement of the piezoelectric element 300.

The protective substrate 30 is provided with a reservoir portion 32 at the region corresponding to the communication chamber 13. The reservoir portion 32 communicates with the communication chamber 13 of the passage-forming substrate 10.

The protective substrate 30 is provided with a through-hole 33 passing through the protective substrate 30 in the thickness direction at a region between the piezoelectric element holding portions 31 and the reservoir portion 32. A part of the lower electrode 60 and an end portion of the lead electrode 90 are exposed inside the through-hole 33 and are connected to an end of connecting wiring extending from a driving IC (controller 212) (not shown).

The protective substrate 30 is preferably made of a material having almost the same coefficient of thermal expansion as that of the passage-forming substrate 10, for example, glass, a ceramic material, or a single-crystal silicon substrate.

Furthermore, a compliance substrate 40 composed of a sealing film 41 and a fixing plate 42 is bonded on the protective substrate 30. Herein, the sealing film 41 is formed of a flexible material having a low rigidity, such as a polyphenylene sulfide (PPS) film (having a thickness of, for example, 6 μm) and seals one side of the reservoir portion 32.

The fixing plate 42 is formed of a hard material such as a metal, for example, stainless steel (SUS) having a thickness of 30 μm. The fixing plate 42 is provided with an opening 43 by removing the fixing plate in the thickness direction at the region facing the reservoir portion 32. Therefore, the one side of the reservoir portion 32 is sealed with only the sealing film 41 having flexibility.

3. Behavior of Ink Jet Recording Apparatus

The ink jet recording apparatus 100 having a structure described above executes recording operation as a basic operation as follows. The scanning mechanism 210 transports a recording sheet 15 onto the suction platen 250, and the suction platen 250 retains the transported recording sheet 150 flat.

The ink jet head 230 discharges an ink to allow the ink to adhere to the recording sheet 150 while reciprocating (scanning driving) in the M direction above the recording sheet 150 retained by the suction platen 250.

3-1. Mechanism for Discharging Ink

In the ink jet head 230, an ink is fed from an ink supplying means such that the inside from the reservoir portion 32 to the nozzles 21 is filled with the ink. Subsequently, a voltage is applied between the upper electrode 80 and the respective lower electrodes 60 corresponding to the pressure-generating chambers 12 according to recording signals from the driving IC. The application of the voltage causes flexural deformation (flexural vibration) of the elastic film 50 and the piezoelectric layer 70 to increase the pressure inside each of the pressure-generating chambers 12 and thereby discharge ink droplets. As a result, ink droplets adhere onto a recording medium to give a recorded matter of the image recorded on the recording medium.

The potential difference for driving the piezoelectric element 300 is preferably 10 V or more and 40 V or less and more preferably 15 V or more and 30 V or less.

The piezoelectric element 300 during the time in which the ink is not discharged is applied with a voltage having a potential difference that does not allow the ink to be discharged. Specifically, during the non-discharging time, minute vibration is given to the ink by applying a driving voltage that does not allow the ink to be discharged to the piezoelectric element 300 in a state in which the meniscus of the ink lies near the nozzle surface (discharge port 22). The ink near the nozzle surface finely vibrates and is thereby stirred, and fluidity is also given to the surface, resulting in prevention of clogging.

4. Ink Composition

Subsequently, the ink composition and additives (components) contained or optionally contained in the ink composition will be described. The ink composition is composed of a self-dispersible pigment, a solvent (e.g., water or an organic solvent), and optionally, for example, a surfactant.

4-1. Pigment

The ink composition contains a pigment (inorganic pigment or organic pigment) as a coloring material. The pigment is more preferably an inorganic pigment. The pigment in the embodiment is a self-dispersible pigment provided with functional groups for improving the dispersibility. The functional groups may be any groups, and examples thereof include carboxyl groups, phosphate groups, and sulfonate groups. The inorganic pigment preferably has carboxyl groups or phosphate groups on the surface. The dispersibility is further improved by electrostatic repulsion of the functional groups on the surface.

The content of the pigment is preferably 2% by mass or more and 8% by mass or less.

Examples of the inorganic pigment include simple metals (for example, carbon black, gold, silver, copper, aluminum, nickel, and zinc), oxides (for example, cerium oxide, chromium oxide, aluminum oxide, zinc oxide, magnesium oxide, silicon oxide, tin oxide, zirconium oxide, iron oxide, and titanium oxide), sulfates (for example, calcium sulfate, barium sulfate, and aluminum sulfate), silicates (for example, calcium silicate and magnesium silicate), nitrides (for example, boron nitride and titanium nitride), carbides (for example, silicon carbide, titanium carbide, boron carbide, tungsten carbide, and zirconium carbide), and borides (for example, zirconium boride and titanium boride). Most preferred is carbon black.

The organic pigment is not particularly limited, and examples thereof include quinacridone pigments, quinacridonequinone pigments, dioxadine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

The pigment preferably has an average particle diameter of 250 nm or less, which can inhibit clogging in nozzles and further improves discharge stability. The average particle diameter is more preferably 200 nm or less. The average particle diameter is that on volume-basis and is measured with, for example, a particle-size distribution analyzer employing a laser diffraction/scattering method as the measurement principle. The particle-size distribution analyzer may be one employing a dynamic light scattering method as the measurement principle, and an example thereof is Microtrac UPA manufactured by Nikkiso Co. Ltd.

4-2. Solvent

The solvent constituting the ink composition is, for example, water or an organic solvent.

The content of water is not particularly limited and is preferably 10% by mass or more and 80% by mass or less and more preferably 25% by mass or more and 70% by mass or less.

The organic solvent may be any organic solvent having an SP value of 14 $(cal/cm^3)^{1/2}$ or more and 16 $(cal/cm^3)^{1/2}$ or less measured by a Hansen method and is preferably a polyhydric alcohol or a lactam.

Examples of the organic solvent include lactams and alkyldiols having an SP value of 14 $(cal/cm^3)^{1/2}$ or more and $(cal/cm^3)^{1/2}$ or less. Specifically, preferred examples of the organic solvent include, but not limited to, 2-pyrrolidinone having a lactam structure; alkyldiols such as propylene glycol and 1,3-butanediol, and their mixtures containing 2-pyrrolidinone. In particular, preferred are propylene glycol and 2-pyrrolidinone, and most preferred is 2-pyrrolidinone.

The content of the lactam or alkyldiol having an SP value of 14 $(cal/cm^3)^{1/2}$ or more and 16 $(cal/cm^3)^{1/2}$ or less is preferably 1% by mass or more and 30% by mass or less and more preferably 2% by mass or more and 20% by mass or less. When the SP value is within the range of 14 $(cal/cm^3)^{1/2}$ or more and 16 $(cal/cm^3)^{1/2}$ or less, the solvent has high compatibility with self-dispersible pigments having hydrophilic functional groups and can satisfactorily disperse the pigments. In particular, such a solvent has high compatibility with self-dispersible pigments provided with carboxyl groups or phosphate groups.

The solubility parameter (SP value) will now be described. The SP value in the invention is measured by a Hansen method. In the Hansen method, an SP value δ is classified into three terms and calculated by an expression: $\delta^2=\delta_d^2+\delta_p^2+\delta_h^2$, in which $\delta_d$, $\delta_p$, and $\delta_h$ are solubility parameters respectively correspond to a dispersion force term, a dipole-dipole force term, and a hydrogen bonding force term. The values of δ, $\delta_d$, $\delta_p$, and $\delta_h$ of organic solvents used in the invention and comparative examples are shown in Table 1.

TABLE 1

| | Hansen SP value | δd (Dispersibility) | δp (Polarity) | δh (Hydrogen bond) |
|---|---|---|---|---|
| Water | 23.90 | 15.50 | 16.00 | 42.30 |
| Glycerin | 18.08 | 17.40 | 12.10 | 29.30 |
| Propylene glycol | 15.10 | 16.80 | 9.40 | 23.30 |
| Methanol | 14.84 | 15.47 | 12.27 | 22.16 |
| 1,3-Butanediol | 14.47 | 16.60 | 10.00 | 21.50 |
| 2-Pyrrolidinone | 14.20 | 19.40 | 17.40 | 11.30 |
| Triethylene glycol | 13.80 | 16.00 | 12.50 | 18.60 |

4-3. Surfactant

The ink composition preferably contains a surfactant. The type of the surfactant is not particularly limited, and the surfactant is preferably an acetylene glycol surfactant or polysiloxane surfactant. The acetylene glycol surfactant and polysiloxane surfactant can each enhance the wettability of an ink to a recording surface such as a recording medium and thereby enhance the permeability of the ink.

4-4. Other Components

The ink composition may contain components (other components), in addition to the above-described components. Such components are, for example, a pH adjuster, a penetrant, an organic binder, a urea compound, a saccharide, a dry inhibitor, a resin dispersant, a resin emulsion, and wax.

5. Examples and Comparative Examples

The ink jet recording apparatus and the ink jet recording method of the invention will be specifically described by Examples and Comparative Examples, which do not limit the scope of the invention.

Ink Jet Recording Apparatus

In Examples and Comparative Examples, ink jet printer PX-H6000 (manufactured by Seiko Epson Corporation) was used as the ink jet recording apparatus 100.

Ink Composition

Table 2 shows the components of the ink compositions used in Examples 1 to 20 and Comparative Examples 1 to 9, which were prepared with the types and contents of the pigments and the organic solvents (polyhydric alcohols) shown in Tables 3 and 4.

The main materials are as follows:

Self-dispersible pigment: The surface was treated with carboxyl groups as the functional groups.

Resin-dispersed pigment: Styrene-acrylic resin A (weight-average molecular weight: 78000, resin acid value: 100) was used.

Organic solvent: As the organic solvent having an SP value of 14 to 16 $(cal/cm^3)^{1/2}$ 2-pyrrolidinone or propylene glycol was used. In Comparative Examples, triethylene glycol not having an SP value within the above-mentioned range was used.

TABLE 2

| Base composition Pigment | Pigment | Addition amount (see Tables 3 and 4) |
|---|---|---|
| Organic solvent (polyhydric alcohol) | Glycerin | 10.0% by mass |
| | Trimethylolpropane | 1.7% by mass |
| | Triethylene glycol | (see Tables 3 and 4) |

TABLE 2-continued

| Base composition Pigment | Pigment | Addition amount (see Tables 3 and 4) |
|---|---|---|
| | 2-Pyrrolidinone | (see Tables 3 and 4) |
| | Propylene glycol | (see Tables 3 and 4) |
| | 1,2-Hexanediol | 3.0% by mass |
| | Latemul WX | 0.1% by mass |
| Surfactant | Olfine E1010 | 0.5% by mass |
| | Surfynol DF110D | 0.25% by mass |
| Drying inhibitor | Tripropanolamine | 2.4% by mass |
| Water | | Residual quantity |

lines were then recorded. Subsequently, discharging was stopped for the non-discharging times shown in Table 3, and lines were then recorded again.

The landing positions of the ink before and after the non-discharging time were compared with each other for evaluating recording quality. The results are shown in Table 3. The evaluation criteria are as follows:

A: a displacement of ink-landing position of less than 10 μm;

B: a displacement of ink-landing position of exceeding 10 μm and 40 μm or less;

C: a displacement of ink-landing position of exceeding 40 μm and 150 μm or less; and

TABLE 3

| | | Pigment (% by mass) | | Organic solvent (% by mass) | | | Recording apparatus | | Evaluation results | | | |
|---|---|---|---|---|---|---|---|---|---|---|---|---|
| | | Self-dispersion | Resin-dispersion | Triethylene glycol | 2-Pyrrolidinone | Propylene glycol | Discharging rate [m/s] | Driving potential difference [V] | Non-discharge time (sec) 1.65 | 2.80 | 3.95 | 5.10 |
| Example | 1 | 6.0 | — | — | 3.0 | — | 5.0 | 29.0 | B | B | B | C |
| | 2 | ↑ | — | — | ↑ | — | 6.0 | 30.0 | A | A | B | B |
| | 3 | ↑ | — | — | ↑ | — | 8.0 | 32.0 | A | A | A | B |
| | 4 | ↑ | — | — | ↑ | — | 10.0 | 34.0 | A | A | A* | A* |
| | 5 | ↑ | — | — | — | 3.0 | 5.0 | 29.0 | A | A | B | B |
| | 6 | ↑ | — | — | — | ↑ | 6.0 | 30.0 | A | A | B | B |
| | 7 | ↑ | — | — | — | ↑ | 8.0 | 32.0 | A | A | A | B |
| | 8 | ↑ | — | — | — | ↑ | 10.0 | 34.0 | A | A | A* | A* |
| | 9 | ↑ | — | — | 5.0 | — | 5.0 | 29.0 | A | A | B | B |
| | 10 | ↑ | — | — | ↑ | — | 6.0 | 30.0 | A | A | A | B |
| | 11 | ↑ | — | — | ↑ | — | 8.0 | 32.0 | A | A | A | A |
| | 12 | ↑ | — | — | ↑ | — | 10.0 | 34.0 | A | A | A* | A* |
| | 13 | ↑ | — | — | — | 5.0 | 5.0 | 29.0 | A | A | B | C |
| | 14 | ↑ | — | — | — | ↑ | 6.0 | 30.0 | A | A | A | B |
| | 15 | ↑ | — | — | — | ↑ | 8.0 | 32.0 | A | A | A | A |
| | 16 | ↑ | — | — | — | ↑ | 10.0 | 34.0 | A | A | A* | A* |
| | 17 | ↑ | — | — | 10.0 | — | 5.0 | 29.0 | B | B | B | B |
| | 18 | ↑ | — | — | — | 10.0 | ↑ | 29.0 | B | B | B | B |
| Comparative | 1 | 6.0 | — | — | — | — | 5.0 | 29.0 | B | B | C | D |
| Example | 2 | ↑ | — | 1.0 | — | — | 6.0 | 30.0 | B | B | C | D |
| | 3 | ↑ | — | — | 1.0 | — | 6.0 | 30.0 | B | B | C | C |
| | 4 | ↑ | — | — | — | 1.0 | 6.0 | 30.0 | B | B | C | C |
| | 5 | ↑ | — | 3.0 | — | — | 6.0 | 30.0 | B | B | C | D |
| | 6 | — | 5.0 | — | 1.0 | — | 6.0 | 30.0 | B | B | B | C |
| | 7 | — | ↑ | — | 3.0 | — | 6.0 | 30.0 | B | B | B | C |

TABLE 4

| | | Ink jet head | Self-dispersion (% by mass) | Organic solvent (% by mass) 2-Pyrrolidinone | Propylene glycol | Recording apparatus Discharging rate [m/s] | Driving potential difference [V] | Evaluation results Non-discharge time (sec) 1.65 | 2.80 | 3.95 | 5.10 |
|---|---|---|---|---|---|---|---|---|---|---|---|
| Example | 19 | Head 1 | 6.0 | 5.0 | — | 6.0 | 30.0 | A | A | A | B |
| | 20 | Head 1 | ↑ | — | 5.0 | ↑ | ↑ | A | A | A | B |
| Comparative | 8 | Head 2 | 6.0 | 5.0 | 5.0 | 6.0 | 30.0 | A | B | B | C |
| Example | 9 | Head 2 | ↑ | — | — | ↑ | ↑ | B | B | C | D |

Evaluation 1

Examples 1 to 18 and Comparative Examples 1 to 7

Evaluation was performed at the ink-discharging rates and the potential differences between driving voltages applied to piezoelectric elements shown in Table 3.

The head of an ink jet printer PX-H6000 was filled with any of the ink compositions of Examples and Comparative Examples. Subsequently, a nozzle check pattern was printed for confirmation of no filling defect and nozzle clogging, and D: a displacement of ink-landing position of exceeding 150 μm.

As obvious from the evaluation results shown in Table 3, the effects of 2-pyrrolidinone or propylene glycol used as the organic solvent, the ink-discharging rate, and the potential difference between driving voltages applied to piezoelectric elements are recognized.

The evaluation result indicated with "A*" in Table 3 means a tendency of generating a large amount of mist, in addition to the evaluation result judged as "A".

Evaluation 2

Examples 19 and 20 and Comparative Examples 8 and 9

As shown in Table 4, Examples 19 and 20 using an ink jet head 230 (head 1) provided with communicating paths 97 having a length of 400 μm and Comparative Examples 8 and 9 using a known ink jet head (head 2) not provided with the communicating paths 97 were evaluated. The ink jet heads having a nozzle resolution of 300 dpi in the longitudinal direction were used.

The heads were each filled with any of the ink compositions of Examples and Comparative Examples. Subsequently, a nozzle check pattern was printed for confirmation of no filling defect and nozzle clogging, and lines were then recorded. Subsequently, discharging was stopped for the non-discharging times shown in Table 4, and lines were then recorded again. The landing positions of the ink before and after the non-discharging time were compared with each other for evaluating recording quality. The results are shown in Table 4. The evaluation criteria are the same as above.

As obvious from the evaluation results shown in Table 4, the effects of 2-pyrrolidinone or propylene glycol used as the organic solvent and of the communication paths 97 were recognized. On the other hand, in the cases of the ink compositions containing triethylene glycol or glycerin not having an SP value within the above-mentioned range, satisfactory effects were not obtained.

As described above, the ink jet recording apparatus according to the embodiment can provide the following effects.

The ink jet recording apparatus 100 includes communicating paths 97 each communicating between a pressure-generating chamber 12 and a discharge port 22. Accordingly, even if thickening or solidification of the ink composition occurs near the discharge port 22, the thickening or solidification is prevented from reaching the pressure-generating chamber 12 being apart from the discharge port 22 by the communicating path 97. As a result, the pressure-generating chamber 12 does not highly affect or less affects the pressure to be generated.

Since the ink composition is discharged from the discharge ports 22 at a relatively high discharge rate of 5 m/sec or more, ink clogging owing to thickening or solidification of the ink composition is prevented from occurring near the discharge ports 22. Specifically, even if a certain degree of thickening or solidification of the ink composition spreads from near the discharge port 22 to the communicating path 97, since the pressure generated by the pressure-generating chamber 12 due to high speed discharge is relatively high, the thickened or solidified ink composition is readily discharged from the discharge port 22. That is, the ink composition is readily recovered from ink clogging. In addition, since the ink composition-discharging rate is 15 m/sec or less, when the ink composition having a normal viscosity is discharged after the thickened or solidified ink composition is discharged from the discharge port 22, the droplets of the ink composition are not broken into smaller droplets. That is, the ink composition can be discharged in a desired state without being discharged in a mist state.

The ink composition contains a pigment and an organic solvent having an SP value of 14 $(cal/cm^3)^{1/2}$ or more and 16 $(cal/cm^3)^{1/2}$ or less. The pigment is a self-dispersible pigment having carboxyl groups on the surface. The use of the organic solvent having an SP value of 14 $(cal/cm^3)^{1/2}$ or more and 16 $(cal/cm^3)^{1/2}$ or less inhibits separation of the self-dispersible pigment to maintain the dispersion state more stably. Consequently, solidification caused by that the pigment is separated from the organic solvent and aggregates near the discharge ports 22 is prevented. As a result, clogging of the nozzle 21 during the recording operation is prevented to allow more satisfactory recording.

As described above, in the embodiment, thickening or solidification of the ink composition inside the pressure-generating chambers 12 is inhibited, thickening or solidification of the ink composition owing to aggregation of the pigment is inhibited near the discharge ports 22, and since ink clogging can be readily removed even if a certain degree of thickening or solidification of the ink composition spreads from near the discharge port 22 to the communicating path 97, the clogging of the discharge port 22 (nozzle 21) can be inhibited. As a result, for example, in an ink jet recording apparatus having a nozzle 21 that does not discharge an ink for a relatively long time (for example, a printer frequently performing intermittent discharge, such as an LFP performing large-sized recording), clogging of the nozzle 21 during recording operation is prevented to allow more satisfactory recording.

Since the communicating paths 97 have a length of 40 μm or more, even if the ink composition is thickened or solidified near the discharge ports 22, the thickening or solidification is prevented from reaching the pressure-generating chambers 12 being apart from the discharge ports 22 by at least 40 μm via the communicating paths 97.

Since the communicating paths 97 have a length of 600 μm or less, the ink jet head 230 can be configured without increasing the size beyond necessity. The distance from the pressure-generating chamber 12 to the discharge port 22 is 600 μm or less, which can inhibit a reduction in discharge efficiency, due to, for example, an increase in discharge resistance or discharge time lag, in acquisition of the above-described effects.

For example, even if the ink jet head 230 is configured by stacking silicon substrates, the layered structure for forming the communicating paths 97 can be formed by the silicon substrates having a thickness of 40 μm or more and 600 μm or less. Accordingly, the formation of the substrate material or the formation of the layered structure can be more simply and easily performed.

The scanning mechanism 210 moves the ink jet head 230 to form a recording discharge region onto which the ink composition is discharged and a non-recording discharge region at a region outside the recording discharge region. The transport mechanism 211 transports the recording medium (recording sheet 150) to the recording discharge region and moves the recording medium in a direction crossing the extending direction of the recording discharge region. This constitution can inhibit clogging of the nozzles from occurring during scanning by performing flashing onto the non-recording discharge region formed in a region outside the recording discharge region during the intervals between scanning and the subsequent scanning for recording (recording discharge onto a recording discharge region).

This constitution can configure a large-sized ink jet recording apparatus performing recording with high fineness, in addition to the effects described above. Specifically, the intervals of flashing onto the non-recording discharge region can be increased as an effect of inhibiting clogging of the nozzles 21 from occurring during recording operation. Accordingly, for example, in a case of disposing the non-recording discharge region on each side of the recording discharge region, the length of scanning by the ink jet head 230 can be elongated to increase the recording discharge region. That is, a larger-sized ink jet recording apparatus can be configured. In addition, as an effect by inhibiting clogging of the nozzles 21, the volume of the ink composition to be discharged (ink droplet) can be further reduced. Finer recording can be achieved by reducing the volume of each ink droplet and setting the recording resolution to 200 dpi or more.

As obvious from the evaluation results, an ink composition that can more effectively inhibit the clogging of the discharge ports 22 (nozzles 21) owing to thickening or solidification of the ink during the non-discharging time can be obtained by controlling the amount of the organic solvent contained in the ink composition to 1% by mass or more and 20% by mass or less.

Since the piezoelectric elements 300 are driven at a relatively high voltage of 15 V or more, ink clogging owing to thickening or solidification of the ink composition is prevented from occurring near the discharge ports 22. Specifically, even if a certain degree of thickening or solidification of the ink composition spreads from near the discharge port 22 to the communicating path 97, since the pressure generated by the pressure-generating chamber 12 is relatively high due to the piezoelectric element 300 that is driven with a relatively high voltage, the thickened or solidified ink composition is readily discharged from the discharge port 22. That is, the ink composition is readily recovered from ink clogging. In addition, since each piezoelectric element 300 is driven with a potential difference of 60 V or less, the pressure generated by the pressure-generating chamber 12 is not increased beyond necessity. As a result, when the ink composition having a normal viscosity is discharged after the thickened or solidified ink composition is discharged from the discharge port 22, the droplets of the ink composition are not broken into smaller droplets. That is, the ink composition can be discharged in a desired state without being discharged in a mist state.

As obvious from the evaluation results, an ink composition that can more effectively inhibit the clogging of the discharge ports 22 (nozzles 21) owing to thickening or solidification of the ink composition during the non-discharging time can be obtained by controlling the amount of the pigment contained in the ink composition to 2% by mass or more and 8% by mass or less.

According to the effects described above, the ink jet recording apparatus can have the discharge ports 22 that discharge the ink composition onto the non-recording discharge region and can perform the subsequent discharge of the ink composition within a time interval of 1.5 seconds or more and 6.0 seconds or less. Accordingly, for example, the interval of the flashing described above can be elongated up to 6 seconds. That is, for example, even if any of the nozzles is not applied with ink discharging signals for forming an image, the scanning time can be elongated up to the range that allows the interval of flashing to be 6 seconds. That is, if the scanning speed is not changed, the length of the recording discharge region can be elongated up to the range that allows the interval of flashing to be 6 seconds. As a result, a large-sized ink jet recording apparatus performing recording with high fineness can be configured.

The piezoelectric element 300 during the time in which the ink is not discharged is vibrated with a driving voltage that does not allow the ink composition to be discharged. As a result, the ink near the surfaces of the nozzles 21 is provided with fluidity even at the surface by the minute vibration, and the ink thickened or solidified during the non-discharging time is prevented from adhering to the peripheries of the discharge ports 22. Accordingly, the clogging of the nozzles 21 can be further inhibited, together with the effect described above.

Embodiment 2

An ink jet recording method according to Embodiment 2 is performed using the ink jet recording apparatus 100.

In the ink jet recording method according to the embodiment, a larger-sized ink jet recording with high fineness can be achieved by performing the recording using the ink jet recording apparatus 100 that can provide the effects in the embodiment described above.

What is claimed is:

1. An ink jet recording apparatus performing recording by discharging an ink composition onto a recording medium, the apparatus comprising:

an ink jet head including a pressure-generating chamber containing an ink composition and applying a discharge pressure to the ink composition, a discharge port from which the ink composition is discharged, and a communicating path for communicating between the pressure-generating chamber and the discharge port, wherein the ink composition is discharged from the discharge port at a discharge rate of 5 m/sec or more and 15 m/sec or less;

the communicating path has a length of 40 μm or more and 600 μm or less; and the ink composition contains a self-dispersible pigment and an organic solvent having a Hansen solubility parameter of 14 $(cal/cm^3)^{1/2}$ or more and 16 $(cal/cm^3)^{1/2}$ or less.

2. The ink jet recording apparatus according to claim 1, wherein the apparatus has a discharge port resolution per unit length of the recording head of 200 dpi or more.

3. An ink jet recording method using an ink jet recording apparatus according to claim 2.

4. The ink jet recording apparatus according to claim 1, wherein the pigment is a self-dispersible pigment having a carboxyl group on the surface.

5. An ink jet recording method using an ink jet recording apparatus according to claim 4.

6. The ink jet recording apparatus according to claim 1, wherein the apparatus includes a scanning mechanism for moving the ink jet head and a transporting mechanism for moving the recording medium;

the scanning mechanism moves the ink jet head so as to perform scanning and thereby forms a recording discharge region onto which the ink composition is discharged and moves the ink jet head to a region outside the recording discharge region and thereby forms a non-recording discharge region onto which the ink composition is discharged;

the transporting mechanism transports the recording medium to the recording discharge region and moves the recording medium in a direction crossing the extending direction of the recording discharge region; and a recorded image has a recording resolution of 200 dpi or more in the direction of movement of the recording medium by the transporting mechanism.

7. The ink jet recording apparatus according to claim 6, wherein the recording discharge region has a length of 60 cm or more.

8. An ink jet recording method using an ink jet recording apparatus according to claim 7.

9. The ink jet recording apparatus according to claim 6, wherein the ink jet head includes a piezoelectric element that fluctuates the capacity of the pressure-generating chamber; and the piezoelectric element is driven with a driving potential difference of 10 V or more and 30 V or less.

10. An ink jet recording method using an ink jet recording apparatus according to claim 9.

11. The ink jet recording apparatus according to claim 6, wherein the ink composition contains the pigment in a content of 2% by mass or more and 8% by mass or less.

12. An ink jet recording method using an ink jet recording apparatus according to claim 11.

13. The ink jet recording apparatus according to claim 6, wherein the ink jet head discharges the ink composition from the discharge ports onto the non-recording discharge region and discharges the ink composition from the same discharge ports onto the non-recording discharge region again within a time interval of 1.5 seconds or more and 6.0 seconds or less.

14. An ink jet recording method using an ink jet recording apparatus according to claim 13.

15. The ink jet recording apparatus according to claim 6, wherein the piezoelectric element during the time in which the ink is not discharged is driven with a voltage having a potential difference that does not allow the ink composition to be discharged.

16. An ink jet recording method using an ink jet recording apparatus according to claim 15.

17. The ink jet recording apparatus according to claim 6, wherein the organic solvent is a lactam or a polyhydric alcohol.

18. An ink jet recording method using an ink jet recording apparatus according to claim 17.

19. An ink jet recording method using an ink jet recording apparatus according to claim 6.

20. An ink jet recording method using an ink jet recording apparatus according to claim 1.

* * * * *